United States Patent [19]

Gartland

[11] Patent Number: 4,695,702

[45] Date of Patent: Sep. 22, 1987

[54] WELDING-PROCESS HANDLE FOR INTERCHANGEABLE WELDING-PROCESS HEADS

[75] Inventor: Thomas J. Gartland, Huntington Station, N.Y.

[73] Assignee: Eutectic Corporation, Flushing, N.Y.

[21] Appl. No.: 850,628

[22] Filed: Apr. 11, 1986

[51] Int. Cl.[4] ............................................. B23K 9/16
[52] U.S. Cl. ........................... 219/137.63; 219/137.31
[58] Field of Search ........... 219/137.2, 137.31, 137.42, 219/137.44, 137.51, 137.63, 74

[56] References Cited

U.S. PATENT DOCUMENTS 3,265,856 8/1966 Cecil ............................ 219/137.31 X
3,596,786 8/1968 Bernard et al. ............. 219/137.51 X
3,610,875 10/1971 DalMolin ....................... 219/137.63
4,297,561 10/1981 Townsend et al. ............ 219/137.63

Primary Examiner—E. A. Goldberg
Assistant Examiner—C. M. Sigda
Attorney, Agent, or Firm—Hopgood, Calimafde, Kalil, Blaustein & Judlowe

[57] ABSTRACT

The invention contemplates a host-torch body configuration for interchangeable use of a selected one of a variety of different welding-process heads. A bayonet-type locking engagement is quickly operable to connect or disconnect any selected process head. The arrangement is such that the same bayonet-lockable engagement serves electrical-supply, consumable-electrode supply, and gas-supply or gas-venting requirements of particular different welding-process heads.

12 Claims, 10 Drawing Figures

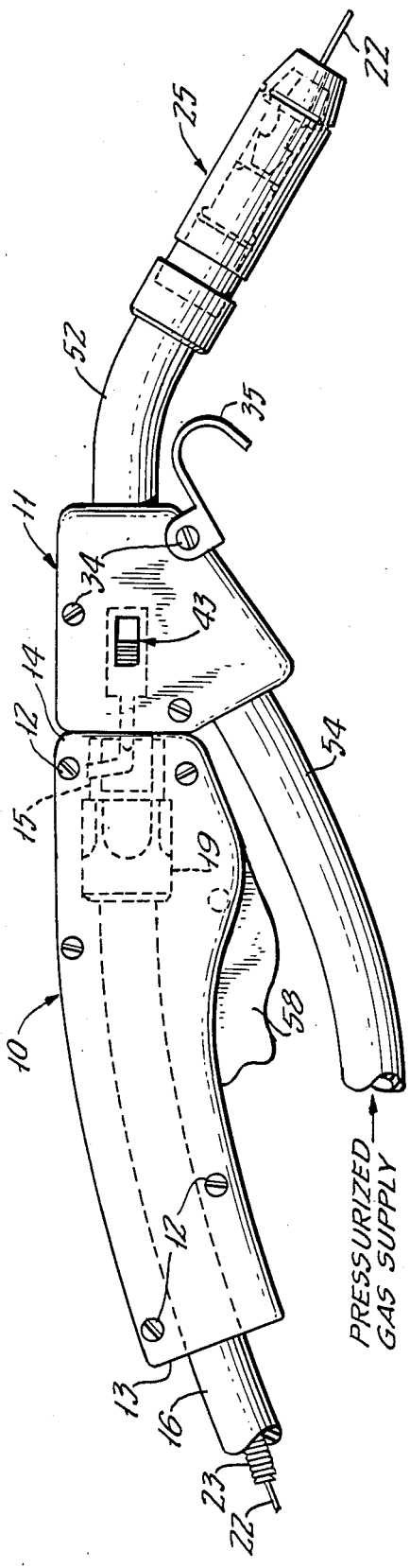
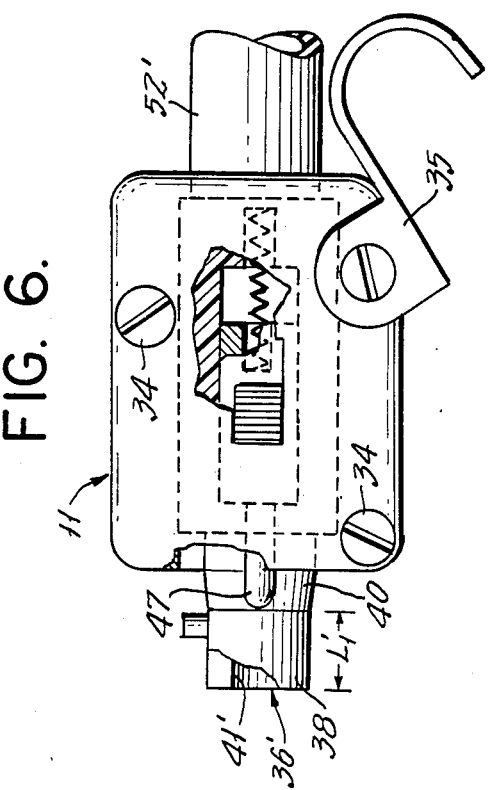
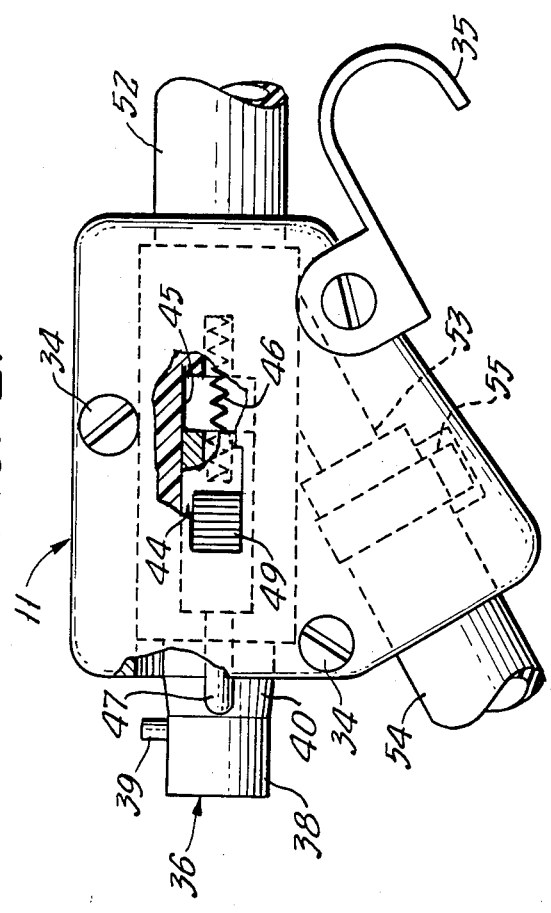

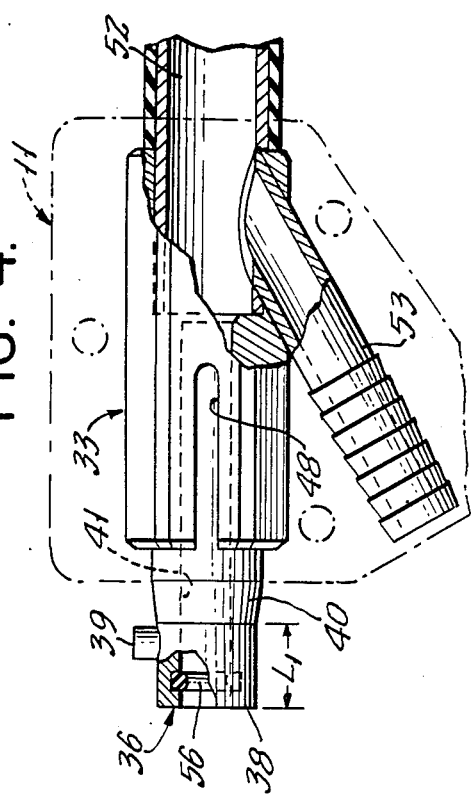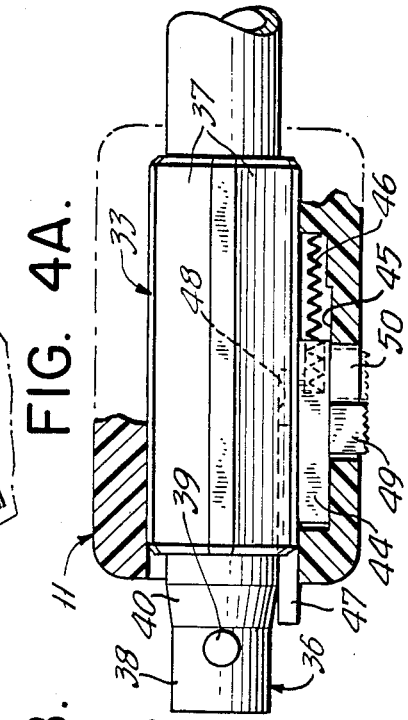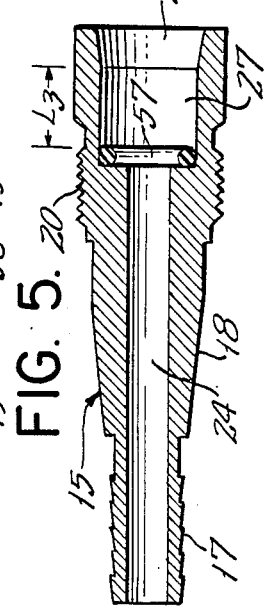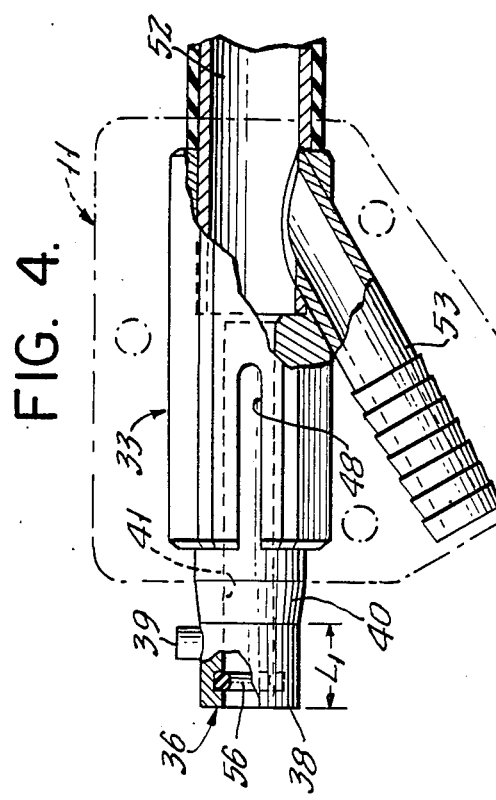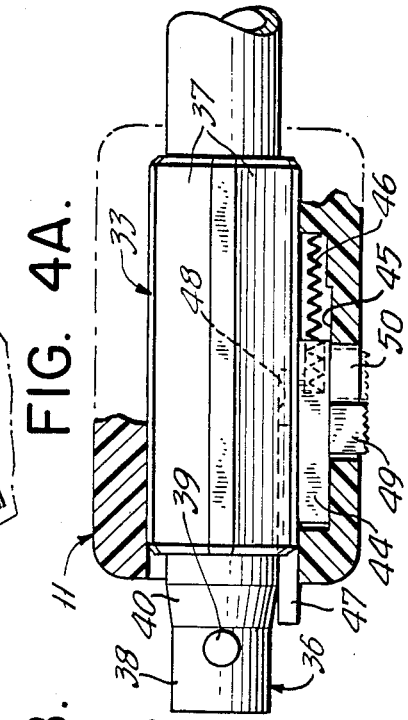

WELDING-PROCESS HANDLE FOR INTERCHANGEABLE WELDING-PROCESS HEADS

BACKGROUND OF THE INVENTION

The invention relates most immediately to a host-torch body or handle construction which will enable a gas metal arc welding (GMAW) shop to accommodate and serve the relatively elevated gas-flow requirements of a gas-constricted arc nozzle, on the basis of selective interchangeability with respect to one or more other arc-welding processes for which the shop may or should be equipped.

Gas-constricted electric-arc nozzles of the character indicated may be as shown and described in pending patent applications, Ser. No. 824,525, filed Jan. 31, 1986, and Ser. No. 850,690, filed Apr. 11, 1986. And in another patent application, Ser. No. 850,626, filed Apr. 11, 1986, an adapter device is described whereby supporting apparatus which exists in gas metal arc welding (GMAW) shops throughout the world may be quickly and selectively adapted to serve the relatively elevated gas-flow requirements of such gas-constricted electric-arc nozzles. It suffices here to state that the GMAW supporting apparatus which remains usable to serve the gas-constricted electric-arc nozzle includes the existing electric-power supply for operation of the arc, existing wire-feeding mechanism in the event of nozzle use with consumable electrode material, existing flexible hose (1) for supplying electric current to a host-torch body dedicated to a particular nozzle configuration and (2) for delivering a flow of shielding gas to the torch body and its nozzle, and an existing gas-flow on/off control means in the form of a solenoid valve.

The only change necessary to adapt this existing apparatus to serve the gas-constricted arc nozzle is to substitute a gas supply of substantially greater capacity for the charged-gas cylinder that is customarily hose-connected to the solenoid; and the substitution is easily effected if the adapter includes a main valve for on/off admission of shop air via a separate flexible hose to the nozzle, while the hose which serves the solenoid valve is disconnected from the gas cylinder and, instead, is connected to the control port of the adapter, thus converting the existing solenoid valve from its original main-valve function to a new pilot-valve function for controlling the main-valve function of the adapter. It suffices here to note that, having made this control connection to the adapter, an opening of the solenoid valve vents the pressure which would otherwise close the main valve of the adapter, with resultant admission of shop air to the torch nozzle; on the other hand, a closing of the solenoid allows a bleed of shop-air pressure to close the main valve of the adapter, with resultant cut-off of shop-air delivery to the torch nozzle.

The conventional host-torch body for a GMAW system is substantially dedicated to essentially a single welding application, the variety of specific application being largely a function of interchangeability of one electrode tip for another, such a change being necessitated by electrode damage attributable to burnback, dross accumulation, or other factors. But now that it appears that existing GMAW equipment can be simply and quickly adapted to serve the additional use of the gas-constricted arc nozzle, a need exists for a host-torch body construction which will enable quick and effective change of nozzle configuration to best serve a prospective welding application.

BRIEF STATEMENT OF THE INVENTION

It is accordingly an object of the invention to provide a host-torch body or handle construction which is quickly, efficiently and universally adapted for interchangeable connected reception of each of a plurality of different arc-welding applications and nozzle/electrode configurations.

It is a specific object to meet the above object with a host-torch body configuration which can interchangeably convert a conventional GMAW torch system to a gouging and/or cutting system which relies on a gas-constricted arc nozzle.

Another specific object is to meet the above objects without major equipment teardown in changing from one to another welding process.

A further specific object is to meet the above objects with a configuration which can selectively serve gas-supply requirements for one welding process as well as the gas-venting requirements of another welding process.

A general object of the invention is to provide a hand-held configuration meeting the above objectives with improved operator comfort, increased welding-process flexibility in use of existing GMAW equipment, and materially reduced requirements for spare-parts inventory.

The invention achieves the above objects with a host-torch body configuration which employs a bayonet-type locking engagement for interchangeable accommodation of each one of a plurality of different welding-process head configurations. The arrangement is such that the same bayonet-type locking engagement serves electrical-supply, consumable-electrode supply, and gas-supply or gas-venting requirements of particular different welding-process heads.

DETAILED DESCRIPTION

The invention will be described in detail in conjunction with the accompanying drawings, in which:

FIG. 1 is a view in side elevation of an assembled host-torch body and arc-welding head, incorporating a quick connect/disconnect feature of the invention;

FIG. 2 is an enlarged fragmentary view in elevation of the connection end of the head of FIG. 1;

FIGS. 3 and 3A are first and second views in side elevation of a connector member of the host-torch body of FIG. 1, these views being taken from aspects which are 90-degrees separated about the connector-member axis;

FIG. 3B is a section taken in the plane 3B—3B of FIG. 3;

FIGS. 4 and 4A are first and second views in side elevation of a connector member in the arc-welding head of FIG. 1, these views being taken from aspects which are 90-degrees separated, as for FIGS. 3 and 3A, respectively;

FIG. 4B is a left-end view of the connector member as depicted in FIG. 4A;

FIG. 5 is a view similar to FIG. 3B to illustrate the only change necessary in the connector member of the host-torch body, in order to accommodate a significant interchange of welding process heads assembled thereto; and FIG. 6 is a view similar to FIG. 2 to illustrate the connection end of a different welding-process head.

In FIG. 1, the invention is shown in application to a host-torch body or handle 10 to which a welding-process head 11 has been detachably assembled. The handle 10 is elongate, tubular and of electrically insulative material, being suitably formed as two mating elongate halves, held together by spaced bolt means 12. As shown, the elongate course of handle 10 and its bore is gently arcuate, for ease of handling and manipulated orientation, and this course extends from a supply end 13 to a discharge end 14. A tubular metal connecting member 15 (see also FIGS. 3, 3A, 3B) is located and retained within handle 10, at the discharge end 14, and a flexible supply hose 16 is accommodated within the bore of handle 10, being connected over the circumferentially barbed tail end 17 of connector 15.

The hose 16 may be a synthetic rubber or the like sheath, lined by a braided tube of copper, and serving for electrical supply to connector member 15, in which case the braided end may be spread to conform to a tapered contact region 18 of the connector member 15, so that a clamp nut 19 (FIG. 1) may be advanced on threads 20 of member 15 to circumferentially bind the conductive braid strands to region 18. It will be understood that suitable counterbore formations at the region of member-15 accommodation in handle 10 may be characterized by keying flats, for retention of nut 19 against rotation, and that the discharge end 21 of member 15 may be characterized by circumferentially spaced flats 21' having similar antirotational engagement to the counterbore of handle 10.

A consumable electrode 22 is continously supplied from feed means (not shown) via a flexible guide sheath 23 contained within hose 16, there being sufficient radial clearance between guide sheath 23 and the lined bore of hose 16 to provide a continuous passage for a flow of arc-shielding gas within hose 16. This guide sheath will be understood to pass with gas-feeding clearance through the bore 24 of connector member 15, and for as far therebeyond as may be required to serve the nozzle 25 of the process head 11 that is connected to and served by the host-torch body 10.

At its discharge end 21, the bore of connector member 15 is substantially enlarged by a counterbore that is characterized by an axially inner cylindrical portion 27 and by an axially outer frusto-conical flaring surface 28 which diverges from the cylindrical surface; and, as best seen in FIG. 3A, the discharge end 14 of the handle 10 fully laps the discharge end 21 of connector member 15, for electrical safety. For bayonet-engagment purposes, an L-shaped groove or slot is formed in the discharge end 21 of connector member 15; from the point of view of member 15 alone, this formation is a slot, but in view of the lapping relation of body 10 the formation is effectively a groove. In any case, as shown, this L-shaped formation comprises (a) an axially directed entry portion 29 which traverses the flaring surface 28 and extends to the cylindrical surface 27, and (b) an arcuate portion 30 which extends from the axially inner end of entry portion 29 and only through a limited angular extent (e.g., 90 degrees) of the cylindrical surface 27; preferably, this arcuate portion 30 is characterized by an angle of axially inward helical advance from the axially inner end of entry portion 29, as is apparent from FIGS. 3 and 3A.

Description of connector member 15 is completed by noting a drilled bleed passage 31 which can provide venting (to ambient air) of gas pressure within hose 16. This passage 31 communicates with the axially inner end of cylindrical surface 27, and its purpose will later become clear.

FIGS. 4, 4A and 4B are directed to the tubular metal connector member 33 retained within the tubular insulative body of the application head 11, but with its supply connection end 36 projecting axially beyond body 11, for detachable coaction with the end 21 of member 15. Fragmentary sectioning in FIG. 4A shows body 11 to comprise mating halves which, as in the case of body 10, are held together by spaced bolt means 34, one of which is seen in FIG. 1 to mount a hook 35 for convenient wall or other suspension when the torch is not in use. Spaced flats 37 around the body of member 33 will be understood to have antirotational engagement to corresponding flats in the molded cavities of the respective halves of body 11.

For secure engagement of the connected bodies 10–11, the projecting end 36 of connector member 33 is characterized by an axially outer cylindrical surface 38 of length $L_1$ slightly less than the length $L_2$ of the counterbore surface 27 with which it has running clearance; a radial pin 39 projects from surface 38 for bayonet-slot engagement at 29–30, and an expanding frusto-conical taper 40 flares at a divergence angle to match that of the counterbore surface 28.

To engage and assemble the head 11 and its nozzle 25 to the host-torch body or handle 10, the consumable electrode and its sheath 23 must be inserted and fed through the bore 41 of connector member 33 and as far therebeyond as is necessary to serve the purposes of the involved nozzle 25; then with the host body 10 and its connector member 15 oriented as in FIG. 3, and with nozzle head 11 and its connector member 33 oriented as in FIG. 4A, the projecting end 36 is inserted into the counterbore 27 until pin 39 traverses the axial portion of the bayonet slot or groove, whereupon a 90-degree relative rotation of bodies 10–11 helically cams the tapered surfaces 40–28 into securely seated relation, with adjacent ends of bodies 10–11 either abutting or very closely adjacent.

A latch mechanism carried by the head 11 provides antirotational security for the thus-engaged assembly of bodies 10–11. As shown, a latch member 43 is characterized by a rectangularly prismatic body 44 which is slidably guided by and captive within a longitudinal guide groove 45 of limited length within one of the mating halves of the insulative body of head 11, and a compression spring 46 loads body 44 in the axial outward direction; a latch tongue 47 is an integral formation with body 44 and is guided by a longitudinal groove 48 in the body of connector member 33. Finally, a finger-access lug 49 integrally formed with body 44 is externally accessible via a limited opening or slot 50 in the body of head 11.

It will be clear that, in the process of pin 39 insertion into entry slot 29, the latch tongue 47 has initial interference with the end face of the host connector member 15, being at 90-degree offset from pin 39. This interference retracts latch member 43, as pin 39 develops increasing bayonet engagement, until such time as bodies 10–11 have been rotated 90 degrees, at which point the latch tongue snaps forward into dogging engagement with the entry slot 29. Of course, to dissamble the head body 11 from the host body, manual retraction of the latch via finger lug 49 is necessary before rotating the bodies out of the bayonet engagement.

What has thus far been described is generally speaking applicable for any one of a variety of application or process head/nozzle combinations to be served by the host-torch body. In FIGS. 1 to 4, the illustrative combination involves a gas-constricted metal arc nozzle 25, being one of the varieties described in patent applications which have been referenced above. It suffices here to note that such a nozzle 25 requires a very much greater supply of gas under pressure than could ever be provided by the conventional GMAW hose 16. For this reason, the head 11 which is dedicated to nozzle 25, via a gooseneck connection 52, is side-ported via a hose-connection fitting 53 which is externally accessible to receive pressurized gas supply (such as shop air) via an additional hose 54, which in FIG. 2 is shown clamped at 55 over the barbed end of fitting 53. In order that the side-ported connection shall not constitute an impediment to full flow and pressure delivery to nozzle 25, the side-port fitting 53 is shown discharging into the bore of gooseneck 52, which has a diameter materially greater than that of either of the connecting member bores 41-24.

It is indicated above that in the event of converting existing GMAW equipment to serve the greater gas-flow requirements of a gas-constricted arc nozzle, such as the nozzle 25, it is most desirable to use the adapter described in said copending application Ser. No. 850,626, in which case an opening of a solenoid valve vents the pressure fluid which had been holding the closed condition of the main valve in the adapter. Thus, when the main valve opens, solenoid venting is via the existing GMAW equipment and into hose 16, and the bleed passage 31 in connector member 15 assures that such venting can proceed without building pressure in hose 16. At the same time, a seal member, such as an elastomeric O-ring 56, retained in a groove near entry into the bore 41 of connector member 33 establishes resilient closure of any possible back-flow passage, by sealing an annular engagement to the guide sheath 23 for the consumable electrode material.

For situations in which the process head attached to the host-torch body 10 requires gas flow via the hose 16, as for example when the welding-arc nozzle (not shown) which is dedicated to a different head 11' (see FIG. 6) is of the gas-shielded variety, the bleed port passage 31 is not desired, because the entire flow of shielding gas must be delivered via gooseneck or other connection 52' to the welding-arc nozzle. FIG. 5 illustrates that in such case, the simple insertion of an elastomeric O-ring 57 into gently interfering fit at the inner end of cylindrical counterbore 27 provides a means of selectively closing the bleed passage 31, when head 11' (with its nozzle, not shown) is assembled into locked bayonet engagement with the host-torch body 10. As seen in FIG. 5, with O-ring 57 thus positioned, the effective axial extent $L_3$ of cylindrical surface 27 is less than that ($L_1'$) of the head (11') projection 36' which is inserted; therefore, to complete the bayonet pin/slot advance to the snap-in point of latch-43 action is to axially compress the O-ring and thus assuredly close passage 31. Further, since shielding gas must be allowed to flow through head 11' and to its nozzle, it will be understood that no equivalent of the sealing ring 56 of FIG. 4 is desired or usable in the bore 41' of head 11'. Finally, since the head 11' and its nozzle (not shown) require no additional gas supply, the side-porting connection 53 of FIG. 4 is not needed in the head 11' of FIG. 6; the head 11' therefore is of simpler construction, providing only a single through-passage via neck 52', but the bayonet-engaging and self-locking features described in connection with FIGS. 2 and 4A remain identically the same in FIG. 6, thereby assuring that the same fidelity of head-to-host engagement regardless of the nozzle or electrode configuration into which these standardized head features may be built.

The described releasable fit of connector members 15-33 to each other may be described as a male-female engagement. For fidelity and security of the engagement, it makes no difference whether the male member is part of the host torch (with the female member on the head end of the process nozzle or electrode) or whether these members are as shown and described. However, it is considered preferable to have the female member on the host torch so as to minimize chances of developing an inadvertent electrically grounding contact with the conductive member 15.

It will be seen that the described welding-process handle and standardized process-head construction meets all stated objects and renders existing GMAW and other gear directly and selectively usable for a number of different arc-welding processes, which those in the art will recognize to include gas metal arc welding (GMAW), flux-cored arc welding (FCAW), continuous electrode gouging and cutting (EXO), submerged-arc welding (SAW), and shielded metal arc welding (SMAW). In every case, the handle 10 is easily manipulated, without ambiguity of orientation, and a trigger 58 is conveniently accessible at the handle, for torch-control purposes, it being understood that control wiring to serve trigger 58 may be a component part of hose 16.

What is claimed is:

1. An electric-arc torch assembly comprising an elongate tubular host-torch body of electrically insulative material extending between a supply end and a discharge end, a first tubular metal connector member retained within said host-torch body at said discharge end, a flexible hose connected to said connector member via the supply end of said host-torch body, said hose containing a tubular guide for consumable electrode material fed to and through said first connector member, and said hose having internal clearance with said guide and therefore provision for gas flow to said first connector member, said hose also containing flexible electrical-conductor material connected to said first connector member; and a welding-process head having a supply end detachably connected to the discharge end of said host-torch body via said first connector member, said welding-process head extending between said supply end and a discharge end and having a tubular casing of electrically insulative material, a second tubular metal connector member retained within said welding-head casing at the supply end thereof and having internal clearance with said tubular guide, adjacent ends of said metal connector members having coacting detachable formations for removable assembly of the welding-process head to said host-torch body; said welding-process head including a gas-constricted arc-nozzle connected to the discharge end of said head, an elastomeric seal ring for closing the internal clearance with said tubular guide and an external side-port gas-supply connection communicating with the interior of said second metal connector at a location downstream from said seal ring, for supply of substantial gas flows to said nozzle without back flow past said seal ring; whereby, upon detachment of said welding-process head from said host-torch body, a different welding process head that is dedicated to gas-shielded arc purposes may be similarly assembled to said host-torch body in unsealed internal-clearance relation with said tubular guide.

2. The assembly of claim 1, in which said adjacent ends comprise fitted coaxial male and female surfaces and said detachable formations are bayonet-locking and include a radial pin extending outward of the male surface and an L-shaped groove for said pin on the female surface, said groove providing a substantially axial region of pin/groove engagement adjacent a rotational region of pin/groove engagement.

3. The assembly of claim 2, in which said coaxial surfaces comprise coaxially guided cylindrical surfaces contiguous to coaxially engageable frusto-conical surfaces.

4. The assembly of claim 2, in which said female surface is on said first connector member and is fully contained within said host-torch body.

5. The assembly of claim 1, in which the supply end of said second connector is characterized by a bore having relatively close-clearance relation with the tubular guide for consumable electrode material, said seal ring being retained by said second connector at the location of said clearance relation, and in which the downstream end of said second connector is characterized by a counterbore having substantial clearance with said tubular guide, said side-port connection communicating with said counterbore.

6. The assembly of claim 5, in which said side-port connection communicates with said counterbore on a directional alignment which is at an acute angle of convergence with respect to the directional alignment of the counterbore, such convergence being toward the downstream end of said second connector member.

7. The assembly of claim 1, in which the discharge end of said head is a nozzle of a variety selected from the group comprising; a gas metal arc welding nozzle, a flux-cored arc welding nozzle, a continuous electrode gouging and cutting nozzle, a submerged-arc welding nozzle, and a shielded metal arc welding electrode holder.

8. The assembly of claim 2, in which the rotational region of pin/groove engagement is characterized by an angle of axially upstream helical advance.

9. The assembly of claim 3, in which the rotational region of pin/groove engagement is characterized by an angle of axially upstream helical advance and is wholly contained within the axial extent of said female cylindrical surface.

10. An electric-arc torch assembly comprising an elongate tubular host-torch body of electrically insulative material extending between a supply end and a discharge end, a first tubular metal connector member retained within said host-torch body at said discharge end, a flexible hose connected to said connector member via the supply end of said host-torch body, said hose containing a tubular guide for consumable electrode material fed to and through said first connector member, and said hose having provision for gas flow to said first connector member, said hose also containing flexible electrical-conductor material connected to said first connector member; and a welding-process head having a supply end detachably connected to the discharge end of said host-torch body via said first connector member, said welding-process head extending between said supply end and a discharge end and having a tubular casing of electrically insulative material, a second tubular metal connector member retained within said welding-head casing at the supply end thereof, adjacent ends of said metal connector members having coacting bayonet-lock formations for removable assembly of the welding-process head to said host-torch body; said adjacent ends comprising fitted coaxial male and female surfaces and said bayonet-lock formations including a radial pin extending outward of the male surface and an L-shaped groove for said pin on the female surface, said groove providing a substantially axial region of pin/groove engagement adjacent a rotational region of pin/groove engagement, and an axially shiftable locking member carried with a connecting member having said male surface, said locking member being angularly offset from said radial pin, the extent of the angular offset being such that upon rotation into complete bayonet engagement, said locking member may shift axially into engagement with said groove, whereby the head-to-body assembly is retained against bayonet rotation unless said locking member is withdrawn from groove engagement.

11. The assembly of claim 10, in which spring means contained within said welding-process head continuously urges said locking member to a limited axially-projecting extent of groove engageability.

12. An electric-arc torch assembly comprising an elongate tubular host-torch body of electrically insulative material extending between a supply end and a discharge end, a first tubular metal connector member retained within said host-torch body at said discharge end, a flexible hose connected to said connector member via the supply end of said host-torch body, said hose containing a tubular guide for consumable electrode material fed to and through said first connector member, and said hose having provision for gas flow to said first connector member, said hose also containing flexible electrical-conductor material connected to said first connector member; and a welding-process head having a supply end detachably connected to the discharge end of said host-torch body via said first connector member, said welding-process head extending between said supply end and a discharge end and having a tubular casing of electrically insulative material, a second tubular metal connector member retained within said welding-head casing at the supply end thereof, adjacent ends of said metal connector members having coacting bayonet-lock formations for removable assembly of the welding-process head to said host-torch body; said adjacent ends comprising coaxially guided male and female cylindrical surfaces contiguous to coaxially engageable male and female frusto-conical surfaces, the female cylindrical surface being on said first connector member and the female cylindrical surface being of greater axial extent than the male cylindrical surface, whereby at bayonet-engaged fit of said surfaces an axial clearance exists between adjacent ends of said cylindrical surfaces, said first connector member having a side-vent port externally communicating with the axially inner end of said female cylindrical surface, whereby, depending upon whether a particular selected welding-process head does or does not require venting at said first connector, the closed or open condition of said side-vent port may be determined by the insertion or non-insertion of an elastomeric O-ring or the like at said axial clearance.

* * * * *